United States Patent [19]
May

[11] 3,783,487
[45] Jan. 8, 1974

[54] CABLE SPLICE APPARATUS
[75] Inventor: Francis A. May, Pittsburgh, Pa.
[73] Assignee: Consolidation Coal Company, Pittsburgh, Pa.
[22] Filed: Sept. 18, 1972
[21] Appl. No.: 289,603

Related U.S. Application Data
[62] Division of Ser. No. 179,445, Sept. 10, 1971.

[52] U.S. Cl. .............................................. 29/203 D
[51] Int. Cl. ........................................... H01r 43/04
[58] Field of Search ..................... 29/203 D, 203 C, 29/203 J, 203 R,

[56] References Cited
UNITED STATES PATENTS
| | | | |
|---|---|---|---|
| 2,002,220 | 5/1935 | Douglas | 29/203 D |
| 2,276,571 | 3/1942 | Grypma | 29/461 |
| 2,280,351 | 4/1942 | Penfold et al. | 29/203 D |

Primary Examiner—Thomas H. Eager

[57] ABSTRACT
An improved cable splice joining a pair of cables and a cable splicing tool for forming that splice. The cable splice includes a pair of overlapping cable end portions held together in a common copper sleeve. The sleeve is crimped into compressing contact with the overlapping cable end portions and includes a plurality of crimping indentations formed in a circle around the periphery thereof whereby the cable splice has a tensile strength up to the maximum safe tension of the cables being spliced. A cable splicing tool for crimping the copper sleeve having overlapping cable portions therein comprises a pair of opposed die housings adapted to be fitted together in abutting contact for forming a channel-shaped crimping die for receiving said overlapping cable end portions in a copper sleeve. Each die housing includes a semicircular die extending longitudinally thereof and each die includes pendent means projecting radially inwardly thereof whereby fitting said die housing together in abutting contact may compress said pendent means into said sleeve and overlapping cable end portions for forming a crimped cable splice having desired tensile strength. Thereafter, plastic tape, rubber putty and neoprene filler material may be placed around the splice and held there with a suitable insulating tape for sealing and insulating the spliced cables.

3 Claims, 7 Drawing Figures

PATENTED JAN 8 1974　　　　　　　　　　　　　　　　　　　　3,783,487

CABLE SPLICE APPARATUS

CROSS-REFERENCE TO RELATED APPLICATION

This application is a division of United States patent application Ser. No. 179,445, filed Sept. 10, 1971, entitled "AN IMPROVED CABLE SPLICE AND APPARATUS THEREFOR."

BACKGROUND OF THE INVENTION

1. Field of the Invention

This invention relates to the splicing of electrical cables, and more particularly to an improved cable splicing tool for forming a cable splice.

2. Description of the Prior Art

Compression-type couplings for splicing or connecting conducting cables and wires are well known. Such couplings have been found to have superior mechanical and electrical characteristics when compared with nut and bolt-type couplings. In a compression coupling, the connector for a pair of wires is usually made from a ductile metal which may be compressed about the wire conductors by means of specially made tools for exerting a pressure on the connector and wires to be joined therewith. In some cases, compression tools are provided with die grooves or the like for controlling the shape of the compressed connector. U.S. Pat. No. 2,276,571 discloses a splice for joining together the bared ends of electrical wires wherein the bared ends of the wires are inserted in a metal tube or sleeve having outwardly flared end portions. After inserting the wire ends in the metal sleeve, the wires are twisted in opposite directions to effect intermingling of the strands of one wire with those of the other. The middle portion of the metal sleeve is then flattened by means of pliers whereby the sleeve and wires therein are compressed together to form a splice. That splice will not permit carefully controlled strength in a splice joint between a pair of electrical conductors. It is believed that in most cases a splice of the type described in the patent will have a strength greater than the conductor itself. Hence, further cable failure will result at a location in the cable remote from the splice, thus requiring additional splices in the same length of cable. Moreover intermingling of the strands of one wire with those of the other can allow stretching of the splice when the cable splice is under tension. While under tension, pull is placed upon only a part of the intermingled copper strands and the splice may stretch to thereby destroy an insulating seal on the splice. This is especially so where the splice wires are under tension much of the time and required to travel repeatedly over a pulley, for example, as in portable or movable electrical equipment such as that employed in underground mining applications where electrically operated mining machinery advances into a mine while drawing flexible cable, connected to a power source, from a reel. Additionally, the splice there shown comprises a relatively long metal sleeve several times the diameter of the cables of the wires being spliced which can result in an unsatisfactory splice for applications where the spliced wires must repeatedly pass over a pulley.

In addition to the pliers described in the above patent for compressing, or crimping, a wire splice, additional splicing tools have been proposed. For example, hydraulically operated dimpling tools are known. Those tools, though providing a well-crimped splice, permit little or no control over the splice strength. Overcrimping with such tools is common and can weaken the cable splice to thereby encourage a break at the splice ends under relatively low cable tensions. Additionally, splices formed with such tools vary in strength and are often cocked and bent splices.

Additional compression-type cable splices are shown in U.S. Pat. Nos. 2,734,933 and 2,249,492. The former discloses electrical connectors for joining a "tap" wire into a "through" wire while the latter discloses a nut and bolt coupling.

This invention provides an improved cable splice tool for joining electrical cables, which splice has a controlled, predetermined tensile strength. Moreover the invention provides an improved compression-type splice for wire cables which splice has a tensile strength up to, but not in excess of, the maximum safe tension of the cables being joined. The invention further provides a cable splicing tool for forming the improved cable splice in a rapid and efficient manner. A cable splice according to the invention may be formed "in the field," and is especially useful in applications where the spliced cable must pass repeatedly over a pulley. Additionally, the invention provides an improved cable splice of controlled tensile strength which is substantially free from stretching, or other permanent distortion, while in use. Other advantages of the invention will become apparent as this specification proceeds.

SUMMARY OF THE INVENTION

This invention provides an improved cable splice for joining a pair of wire cables, and a cable splicing tool for forming that splice. The cable splice includes a pair of overlapping wire cable end portions held together in a common copper sleeve. The sleeve comprises an annular copper sleeve and has flared end portions for receiving opposed cable end portions in overlapping fashion. The copper sleeve is compressibly crimped into compressing contact with a pair of overlapping cable end portions whereby a plurality of crimping indentations is formed in a circle around the periphery thereof and whereby a cable splice between said pair of cables is formed having a tensile strength up to that of the cables being spliced. Most preferably the copper sleeve has a relatively short length; more specifically, a length of about twice that of the diameter of the cables being spliced.

The cable splicing tool for crimping the copper sleeve into compressing contact with a pair of overlapping cable end portions therein comprises a pair of opposed die housings adapted to be fitted together in abutting contact for forming a channel-shaped crimping die. Each die housing includes a semi-circular die which extends longitudinally thereof. Each semi-circular die includes pendent means projecting radially inwardly thereof. Most preferably the pendent means comprise a plurality of ball bearings seated in seats therefor provided in each die housing.

In forming a splice according to the invention, a pair of overlapping cable end portions in a copper sleeve is inserted into one member of the pair of opposed die housings. Thereafter the remaining member is placed atop the sleeve and a force is exerted on the opposed die housings whereby said housings are urged toward abutting contact and whereby the pendent means are compressed into said sleeve and overlapping cable end portions therein for forming a crimped cable splice having crimping indentations located in a circle along the periphery thereof. The die housings are urged toward abutting contact in a manner whereby the cable splice is crimped to a desired degree for providing a cable splice having desired tensile strength. More specifically, the die housings are adapted to "bottom out" in abutting contact whereby a cable splice is crimped to provide a splice having a tensile strength up to, but not in excess of, the maximum safe tension of the cable being spliced. Most preferably the cable splice has a tensile strength of about 85 percent of that of the maximum safe tension of the cables being spliced.

For providing a cable splice having long life and being watertight according to the invention, the cable splice as formed hereinabove is first wrapped with a compressive tape, covered with a rubber tape or rubber putty, and finally wrapped again with a compressive tape, most preferably a fiberglass tape. Most preferably the splice as formed thus far is next coated with suitable adhesive and thoroughly wrapped with an additional layer or layers of insulating, water-resistant tape.

Other details and advantages of the invention will become apparent by reference to the appended drawings, and as the following more detailed description thereof proceeds.

DESCRIPTION OF THE PREFERRED EMBODIMENTS

Figure 1:
FIG. 1 is a pair of conducting cables, each comprising bundles of individual copper wires.
Figure 2:
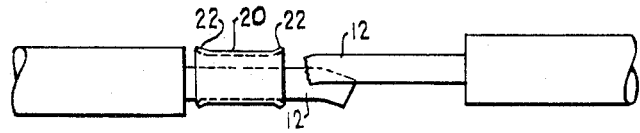
FIG. 2 shows the wires of FIG. 1 in initial overlapping relationship, one of those wires having a copper sleeve thereon.
Figure 3:
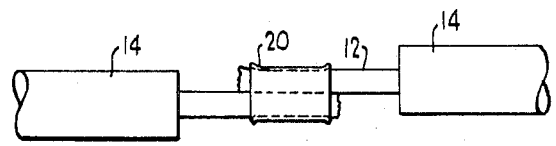
FIG. 3 shows the cables of FIG. 2 in overlapping contact within the copper sleeve.

Referring now to FIG. 1, a pair of cable end portions 10 is shown wherein a conducting cable 12 has been stripped of its insulation coating 14. Each cable 12 comprises a bundle of individual copper wires 13. In forming a cable splice according to the invention, the ends of cable end portions 12 are trimmed, and one of a pair of such cables is inserted into a malleable metallic sleeve 20 (FIG. 2). Metallic sleeve 20 has flared end portions 22 and comprises an annular copper sleeve having a passageway or opening therethrough. The inner diameter of the sleeve 20 is selected so that there is preferably a clearance area of between 0.040 to 0.050 square inches. It has been found that a clearance area of this size is sufficiently large enough to easily insert the pair of conductors and, as later described, permit crimping or compression of the flared sleeve 20 to properly engage the cable end portions. Also, the inner diameter of the sleeve 20 is preferably selected for different sizes of cable to have this clearance area of between 0.040 and 0.050 square inches to thus provide a common clearance area in the sleeves used for different sized cables. Copper sleeve 20 most preferably has a rather short length. A preferred length for copper sleeve 20 is a length equal to about twice the inside diameter of the sleeve. A longer length for a copper sleeve 20 can result in undesirable "bumping" of the cable splice as it passes over a pulley. Sleeve 20 is adapted to receive a pair of cable end portions 12 in overlapping relationship. For inserting a pair of cables into sleeve 20, the end of the second cable inserted into the sleeve is preferably flattened somewhat to permit easier entry into the annular passageway of sleeve 20.

Figure 4:
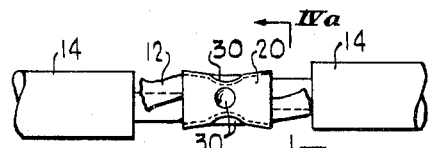
FIG. 4 shows the cables of FIG. 3 spliced according to the invention.
Figure 4A:
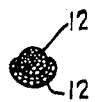
FIG. 4a is a view in section taken along the line A—A in FIG. 4.

In FIG. 2 cable end portions 12 are shown inserted into sleeve 20 in overlapping fashion. Cable end portions 12 are advanced through sleeve 20 until the ends thereof reach insulating material 14 on the cables. Thereafter, the ends of cables 12 are flattened somewhat about each other to insure effective electrical conduction through the splice. Additionally, the ends of cable 12 are spread over 180° of the opposite conductor shown in FIG. 4a.

A plurality of crimping indentations 30 are formed in sleeve 20. Crimping indentations 30 are formed by means of a cable splicing tool 40 shown in FIG. 6. Cable splicing tool 40 comprises a pair of opposed die housings 42 and 44 adapted to be fitted together in abutting contact. Each of opposed die housings 42 and 44 includes a semi-circular die, 43 and 45, respectively. Dies 43 and 45 extend longitudinally of their respective die housings whereby fitting opposed die housings 42 and 44 together in abutting contact results in formation of a channel-shaped crimping die extending longitudinally through the abutting die housings. Each semicirdular die includes pendent means projecting radially inwardly thereof. In the preferred form of cable splicing tool 40 shown in FIG. 6, those pendent means comprise ball bearings 46. Ball bearings 46 are seated and maintained in position within semi-circular dies 43 and 45 in respective seats 47 formed therein. Each of the seats 47 comprises a hole or bore formed, as by drilling, in die housings 42 and 44. Each of the seats is located along a circle along a vertical section through the channel-shaped die formed of semi-circular dies 43 and 45. Each of the seats 47 is drilled to a preselected depth within a die housing whereby a desired portion of a ball bearing 46 extends through the wall of a semi-circular die for forming said pendent means projecting radially inwardly thereof. The balls 46 are held in the die housing seats 47 by reason of deep center punch indentations made in the semi-circular dies 43 and 45 at two points near each of the seats 47.

Figure 6:
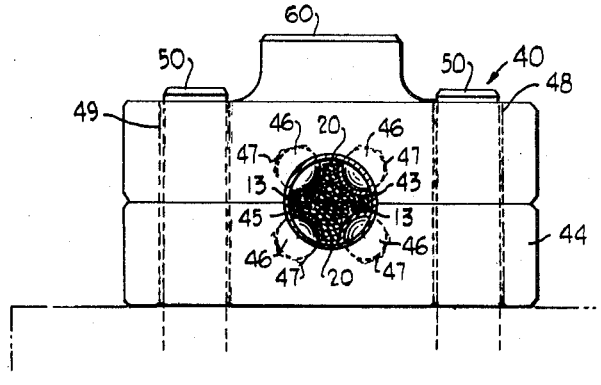
FIG. 6 shows the splice of the preceeding Figures being formed in a splicing tool according to the invention.

In forming the cable splice according to the invention, a pair of cable end portions 12 in a common copper sleeve 20 is inserted in semi-circular die 45 of die housing 44. Thereafter the housing 42 is placed atop the sleeved cables within the die as shown in FIG. 6 in a manner whereby ball bearing pendent means 46 are located along a circle taken through a vertical section as described hereinabove. To insure proper alignment of the semicircular die cavities, each of the die housing members 42 and 44 is provided with a pair of bores 48 and 49, and 48a and 49a respectively. Those respective bore pairs are adapted to be located in a line for receiving dowel pins 50 and whereby sliding or slipping of opposed die housings 42 and 44 is prevented and whereby ball bearings 46 are properly positioned. The dowel pins 50 are aligned and supported by a substantial base plate 51.

After opposed die housings 42 and 44 have been properly aligned having a pair of cable ends in a copper sleeve 20 located therebetween, a crimping splice may be formed. In forming the splice a force is exerted on the opposed die housings whereby the housings are urged toward abutting contact and whereby ball bearings 46 are compressed into sleeve 20 having overlapping cable end portions 12 therein. In that fashion a crimped cable splice having crimping indentations located in a circle along the periphery thereof is formed. In the preferred cable splicing device in FIG. 6, die housing 42 includes a striking surface 60 extending therefrom. In crimping a cable splice, striking surface 60 may be struck with a suitable tool, such as an ordinary hammer, for exerting force on the opposed die housings and urging them toward each other. Most preferably, in forming a crimped splice, striking surface 60 is first struck a few times to make initial crimping indentations 30 in the cables being spliced within the sleeve 20. Thereafter, the cable is rotated within the die until the initial crimping indentations are substantially in line with the next adjacent ball bearings 46. Striking surface 60 is then again struck with a hammer. Rotation of the cable is continued and likewise is striking of surface 60, until die housing 42 "bottoms out" on die housing 44, i.e., until the die housings come into abutting contact. It will be appreciated here that by providing a die which "bottoms out," the degree of crimping and hence strength of a cable splice, is exactly controlled. In forming a cable splice according to the invention, it is thus not possible to overcrimp a cable splice. Cable splices according to the invention have a maximum safe tension of up to, but not in excess of, the tensile strength of the cable being spliced. Most preferably the cable splice has a tensile strength of about 85 percent of the maximum safe tension of the cables being spliced. It should also be appreciated here that cable splicing according to the invention can readily be performed in the field, as the only tools required for forming the splice are a cable splicing tool 40 and a hammer or the like. Thus a cable broken during use may be rapidly and efficiently spliced and returned to service.

Figure 5:
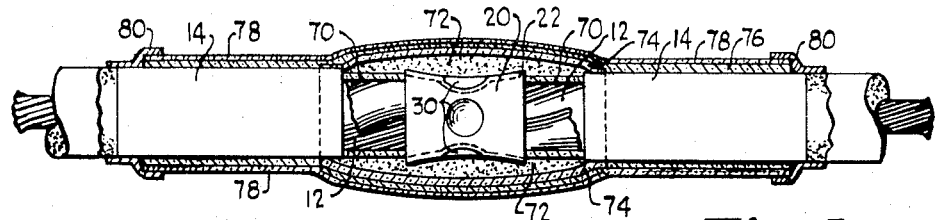
FIG. 5 shows the spliced cables of FIG. 4 in a preferred watertight seal.

In FIG. 5, a preferred waterproof, long-life cable splice according to the invention is shown. There a splice between a pair of overlapping cables 12 within a common copper sleeve 20 having crimping indentations 30 therein is provided in the fashion previously described herein. The bare ends of the exposed cable end portions between the flared ends 22 of sleeve 20 and insulation 14 on the cables is wrapped with a strong compressive tape 70. To compress loose ends of cables 12, preferred tapes include fiberglass tape and plastic electrician's tape, with fiberglass tape being most preferred. An insulating putty 72 is thereafter spread over the entire splice area between insulating materials 14 on cables 12. Sufficient insulating putty 72 is employed for covering the sleeve and splice area, and for providing a putty fill to a diameter equal to or slightly larger than the outside diameter of insulation 14 on cables 12. A suitable insulating putty is "Okonite" Filler Putty No. 602758010. A layer of an insulating material 74 may be placed over the puttied spliced area. Preferably that binding material comprises a fiberglass tape. Thereafter, the surface of insulation 14 on cables 12 is roughened for a length of several inches on either side of the cable splice. A suitable splicing cement is then applied to the entire roughened section and to fiberglass tape 74. The splicing cement preferably comprises a neoprene splicing cement. The entire cement-coated area is then immediately covered with a thin covering of an insulating putty 76, of the same material as 72. A final outer layer of insulating tape 78 is applied lengthwise of the splice for additional sealing and insulating purposes. A suitable and preferred insulating tape 78 comprises that commercially available as "Okonite No. 35 Red Jacket" tape. An end cap 80 for the insulation and sealing materials is provided and may comprise a several layer wrap of an insulating tape, such as the Okonite" tape mentioned above. The splice as thus prepared is ready for service in an electrical installation. It has been found that a splice of the type described with respect to FIG. 5 provides a cable splice having a useful life up to several times that of the expected life for the cables being spliced in application where a flexible cable is repeatedly passed over a pulley or reel.

According to the provisions of the patent statutes, I have explained the principle, preferred construction and mode of operation of my invention and have illustrated and described what I now consider to represent its best embodiments. However, I desire to have it understood that, within the scope of the appended claims, the invention may be practiced otherwise than as specifically illustrated and described.

I claim:

1. A cable splicing tool in forming a splice between a pair of cables in a common metallic sleeve comprising a pair of opposed die housings, each of said die housings having a semicircular die therein, each of said semicircular dies including pendent means projecting radially inwardly thereof, said die housings adapted to be fitted together in abutting contact whereby a channel-shaped crimping die is formed by said die housings, said channel-shaped crimping die extending longitudinally through said housings and adapted to receive said pair of cables in said sleeve, whereby fitting said opposed die housings together in abutting contact provides said pendent means along a circle taken through a vertical section of said channel-shaped die, and whereby said pendent means comes into compression contact with said sleeve for forming crimping indentations therein.

2. The cable splicing tool as set forth in claim 1 wherein said pendent means comprises a plurality of ball bearings, each of said ball bearings seated and maintained in position in said semicircular dies.

3. The cable splicing tool as set forth in claim 2 wherein said plurality of ball bearings is maintained in position in said semicircular dies in seats formed therein, each of said seats comprising a bore in said die housings whereby seating said ball bearings in said seats permits a desired portion of each of said ball bearings to extend beyond the walls of said semicircular dies for forming said pendent means projecting radially inwardly thereof.

* * * * *

PO-1050
(5/69)

UNITED STATES PATENT OFFICE
CERTIFICATE OF CORRECTION

Patent No. 3,783,487                    Dated January 8, 1974

Inventor(s) Francis A. May

It is certified that error appears in the above-identified patent and that said Letters Patent are hereby corrected as shown below:

In the Abstract

Line 1                         After 'splice' insert --for--

In the Specification

Column 3, Line 15              After 'compressive' insert --fiberglass--

Column 3, Line 15              After 'tape', first occurence, delete "," and insert --and--

Column 3, Line 15              After 'a' delete "rubber" and insert --filler--

Column 3,                      After 'putty' delete ";" and insert --.--
lines 16 and 17                delete "and finally wrapped again with a compressive tape, most preferably a fiberglass tape."

Column 3, Line 28              After 'wires' delete ";" and insert --, showing the cables stripped of their insulations--

Patent No. 3,733,487 Page 2

Column 12, line 62 : " 
Table I

TABLE I

| | Organic spent cooking liquor substances (kg./100 kg. pulp)) | Kappa number | Viscosity | Brightness |
|---|---|---|---|---|
| Unbleached pulp | | 31.1 | 1,126 | |
| Control | 0 | 19.6 | 1,035 | 34.5 |
| Example number: | | | | |
| 1 | 5 | 15.9 | 969 | 38.0 |
| 2 | 10 | 18.6 | 968 | 36.0 |
| 3 | 15 | 20.5 | 969 | 34.1 |
| 4 | 18 | 20.4 | 942 | 33.7 |

"

should be

TABLE I

| | Organic spent cooking liquor substances (kg./100 kg. pulp)) | Kappa number | Viscosity | Brightness |
|---|---|---|---|---|
| Unbleached pulp | | 31.1 | 1,126 | |
| Control | 0 | 19.6 | 1,035 | 34.5 |
| Example number: | | | | |
| 1 | 5 | 15.9 | 969 | 38.9 |
| 2 | 10 | 18.6 | 978 | 36.0 |
| 3 | 15 | 20.5 | 909 | 34.1 |
| 4 | 18 | 20.4 | 942 | 33.7 |

Column 13, line 26 : "aproximated" should be --approximated--

Column 14, line 55 : "alakli" should be --alkali--

Column 15, line 22 : "sulfate" should be --sulfide--

Column 15, line 67 : "partialy" should be --partially--

Signed and sealed this 14th day of May 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,783,487　　　　　　　　　　Dated January 8, 1974

Inventor(s) Francis A. May

It is certified that error appears in the above-identified patent and that said Letters Patent are hereby corrected as shown below:

In the Abstract

| | |
|---|---|
| Line 1 | After 'splice' insert --for-- |

In the Specification

| | |
|---|---|
| Column 3, Line 15 | After 'compressive' insert --fiberglass- |
| Column 3, Line 15 | After 'tape', first occurrence, delete "," and insert --and-- |
| Column 3, Line 15 | After 'a' delete "rubber" and insert --filler-- |
| Column 3, lines 16 and 17 | After 'putty' delete "," and insert --.- delete "and finally wrapped again with a compressive tape, most preferably a fiberglass tape." |
| Column 3, Line 28 | After 'wires' delete ";" and insert --, showing the cables stripped of their insulation;-- |

This certificate supersedes Certificate of Correction issued May 14, 1974.

Signed and sealed this 5th day of November 1974.

(SEAL)
Attest:

McCOY M. GIBSON JR.　　　　　　　　　　C. MARSHALL DANN
Attesting Officer　　　　　　　　　　　　Commissioner of Patents